United States Patent [19]

Redman et al.

[11] Patent Number: 5,070,575
[45] Date of Patent: Dec. 10, 1991

[54] VERTICALLY ADJUSTABLE SLIDING DOOR SUSPENSION SYSTEM

[75] Inventors: Carl E. Redman, Lake Oswego; James Ingram, Beaverton; Terry Potter, Tualatin; Milo Cejka, Tigard; Joe Dorie; Larry Newman, both of Oregon City; Alfred J. Peirish, McMinnville, all of Oreg.

[73] Assignee: Post Industries, Inc., Portland, Oreg.

[21] Appl. No.: 389,839

[22] Filed: Aug. 4, 1989

[51] Int. Cl.$^5$ ............................................. E05D 15/06
[52] U.S. Cl. ........................................ 16/96 R; 16/98; 16/99; 16/105; 16/107; 49/425; 49/426
[58] Field of Search ............... 16/94 R, 96 R, 97-100, 16/105, 107; 49/425, 426

[56] References Cited

U.S. PATENT DOCUMENTS

| | | | |
|---|---|---|---|
| 946,694 | 1/1910 | Davis | 16/96 R |
| 1,054,357 | 2/1913 | Lange, Jr. | 16/105 |
| 1,357,771 | 11/1920 | Geiger | 16/99 |
| 1,784,029 | 12/1930 | Sisson | 16/105 |
| 2,912,714 | 11/1959 | Rich | 49/425 |
| 3,105,272 | 10/1963 | Tucker, Jr. | 16/105 |
| 3,925,933 | 12/1975 | Reufer | 16/97 |
| 4,106,876 | 8/1978 | Tregoning | 16/105 |

FOREIGN PATENT DOCUMENTS

| | | | |
|---|---|---|---|
| 262835 | 6/1968 | Austria | 49/425 |
| 55682 | 7/1982 | European Pat. Off. | 49/425 |
| 893966 | 12/1944 | France | 16/105 |

Primary Examiner—Richard K. Seidel
Assistant Examiner—Edward A. Brown
Attorney, Agent, or Firm—Klarquist, Sparkman, Campbell, Leigh & Whinston

[57] ABSTRACT

A sliding door suspension system and a sliding door assembly for supporting a heavy sliding door from a door frame includes a rail horizontally mounted to the door frame. The suspension system includes a roller assembly which rollingly engages the rail and supports the heavy door. The roller assembly includes an axle or shaft having a bearing surface. The axle has at least one threaded end for securing the roller assembly and for attaching the roller assembly to a door hanger from which the heavy door is suspended. The roller assembly further includes a roller with a concentric hollow bore for seating a bearing assembly or bushing through which the axle extends in supportive engagement with the bearing assembly. The rail has a convex arcuate upper roller guide surface. The roller has a concave arcuate roller guide engaging surface which conforms to and engages the upper surface of the rail. The roller assembly also includes a door height and alignment adjusting member which threadably engages the axle. In one embodiment, the door height adjusting member comprises an eccentric sleeve, whereas in an alternative embodiment, the door height adjusting member comprises an adjuster block.

15 Claims, 6 Drawing Sheets

VERTICALLY ADJUSTABLE SLIDING DOOR SUSPENSION SYSTEM

BACKGROUND OF THE INVENTION

The present invention relates generally to a suspension system for a sliding door, and more particularly to an improved suspension system for a heavy sliding door, such as may be used in penal institutions.

Other sliding door suspension systems have been used to suspend such heavy doors from above. One known system uses a horizontal trough mounted along an upper edge of the door frame. The door is suspended from a roller assembly which rolls within the trough to slidably open and close the door. To provide smooth operation of the door, the roller is shorter in axial length than the width of the trough. This feature disadvantageously allows for excessive inward and outward movement of the door, that is, movement in a direction perpendicular to the direction in which the door opens and closes. This excessive inward and outward motion of the door may prevent a door locking mechanism from engaging, thereby degrading the overall security and integrity of the sliding door assembly.

Another known sliding door suspension system has a rail made from a length of square steel stock, and a steel roller or wheel from which a sliding door is suspended. The roller has a radial groove machined therein which straddles the square steel rail which, as in the system mentioned above, also disadvantageously allows for excessive inward and outward movement of the door. Also, the steel to steel contact of the roller with the rail disadvantageously creates excessive noise when the door is opened and closed. The steel roller wears the rail, creating sharp edges which lacerate maintenance personnel during routine lubrication which is continually required. Also, the flat upper surface of the rail collects debris during construction of the facility, which may later interfere with the door operation.

Thus, a need exists for an improved sliding door suspension system for suspending heavy doors and for an improved sliding door assembly, such as may be used in penal institutions, which is not susceptible to the above limitations and disadvantages.

SUMMARY OF THE INVENTION

It is an overall object of the present invention to provide an improved sliding door suspension system for suspending heavy doors.

A further object of the present invention is to provide a sliding door assembly with improved mechanical reliability, integrity and security.

An additional object of the present invention is to provide a sliding door suspension system and a sliding door assembly which require minimal maintenance.

A further object of the present invention is to provide an improved roller assembly for a sliding door suspension system which supports a heavy door.

Another object of the present invention is to provide a sliding door suspension system for a heavy door and a sliding heavy door assembly which may be adjusted in height and alignment relative to a supporting door frame.

Still another object of the present invention is to provide a sliding door suspension system having a self-cleaning rail, which sheds debris falling thereon, especially during construction of the facility in which the system is installed.

Yet another object of the present invention is to provide a sliding door suspension system and a sliding door assembly which is quiet in operation.

According to one aspect of the present invention, a sliding door suspension system for supporting a heavy door in a frame includes a rail and a roller assembly. The rail has an upper roller guide surface with an arcuate transverse cross section and a first longitudinal axis. The rail is mounted to the door frame so that the first longitudinal axis is substantially horizontal. The roller assembly includes an axle having a second longitudinal axis and a roller having a hollow bore through which the axle extends. Bearing means are mounted within the hollow bore for rotationally supporting the roller on the axle. The roller also has a roller guide engaging surface of a shape which conforms to and rollingly engages the upper roller guide surface when the second longitudinal axis is substantially perpendicular to the first longitudinal axis and the roller guide engaging surface engages the rail. The roller assembly also includes door support means mounted to the axle outboard of the roller for supporting the heavy door. The roller assembly further includes attachment means for securing the roller and door support means on the axle. In this manner, the door support means supports the door while the roller rolls along the rail to slidably open and close the door in a direction substantially parallel to the first longitudinal axis.

According to another aspect of the present invention, a sliding door assembly is also provided. The door assembly includes a door frame, a heavy door and a rail as described above. The assembly also includes mounting means for mounting the rail to the door frame such that the first longitudinal axis is substantially horizontal. The door assembly further includes a roller assembly as described above to support the door during slidable opening and closure.

According to a further aspect of the present invention, a roller assembly is provided for a sliding door suspension system having a rail as described above for supporting a heavy door in a door frame. The roller assembly includes an axle, a roller, bearing means, door support means and attachment means as described above.

In an illustrated embodiment, the sliding door suspension system described above further includes two roller assemblies and the rail has a transverse circular cross section. Each axle includes a bearing surface upon which the bearing means rides. Each axle also has first and second externally threaded ends to each side of the bearing surface, with the first threaded end of each axle threadably engaged with the respective door support means. The attachment means of each roller assembly is threadably engaged to the first and second threaded ends. The bearing means may comprise a bearing assembly having needle bearings, or alternatively a bushing. Each door support means has an eccentric door supporting surface which is eccentric to the second longitudinal axis so that the height and alignment of the door relative to the door frame may be adjusted by rotating each door support means on the respective axle.

In another illustrated embodiment, the sliding door suspension system described above includes an axle having a bearing surface upon which the bearing means ride, and first and second radial grooves to each side of the bearing surface. The axle also has an externally threaded end beyond the first radial groove which threadably engages the door support means. An attachment means engages the first and second radial grooves of the axle and threadably engages the threaded end. The door support means also includes a door hanger member having an upright leg and a substantially horizontal leg for supporting the door therefrom. The upright leg has a longitudinal slot therethrough which slidably receives the axle. The horizontal leg has a hole therethrough. The door support means also includes door height adjustment means having an adjuster member with a first internally threaded hole therethrough which threadably engages the axle. The adjuster member also has a second internally threaded hole perpendicular to, intersecting with, and terminating at the first internally threaded hole. The height adjustment means also has a threaded member which extends through the hole in the first leg and threadably engages the second internally threaded hole in variable amounts to vary the position of the axle in the longitudinal slot, thereby adjusting the height of the door.

These and other objects, features and advantages of the present invention will become apparent to those skilled in the art from the following description and drawings.

BRIEF DESCRIPTION OF THE DRAWINGS

FIG. 4 is a detailed perspective view of one form of two components of the sliding door assembly of FIGS. 1 through 3;

DETAILED DESCRIPTION OF A PREFERRED EMBODIMENT

Figure 1:
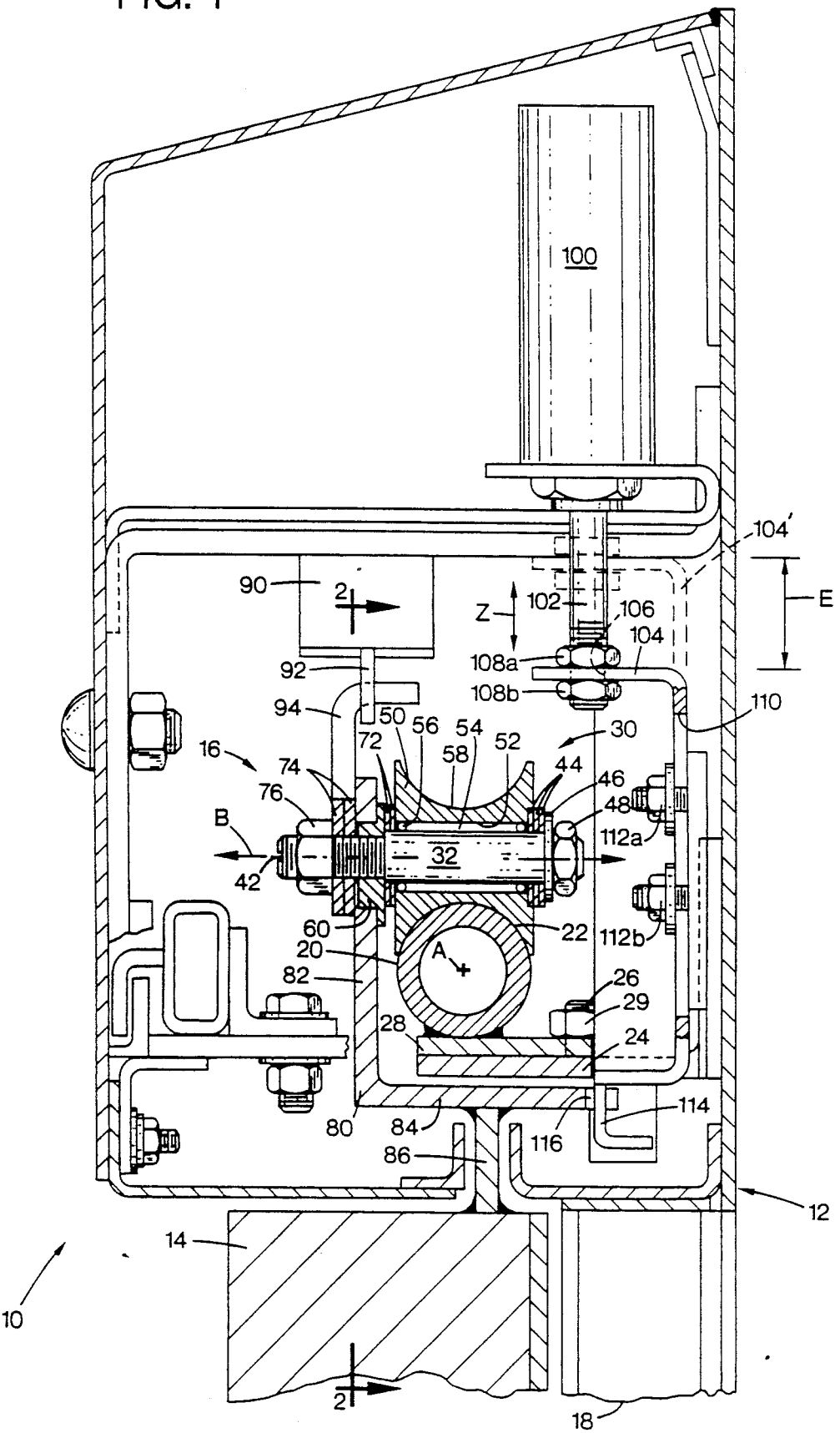
FIG. 1 is a sectional elevational view of one form of a sliding door assembly of the present invention.

FIG. 1 illustrates an embodiment of a sliding door assembly 10 having a door frame 12 and a heavy door 14 slidably suspended from the door frame by a sliding door suspension system 16. The door assembly 10 may be used in penal institutions for the detention of prisoners, in zoos for housing large animals, or for military use, such as in armories. The heavy door 14 may weigh from 200 to 800 pounds or greater, with the typical weight being above 300 pounds. The door 14 slides in a substantially horizontal direction as indicated by arrow X of FIG. 2 to open and close a doorway 18 surrounded by frame 12. The door frame 12 includes a recessed vertical pocket 12a for receiving a leading edge of door 14 when closed.

The suspension system 16 includes a rail 20 having an upper roller guide surface 22 and a first longitudinal axis A. As shown in FIG. 1, the upper roller guide surface 22 in transverse cross section is arcuate, and in the illustrated embodiment, the rail 20 has a transverse circular cross section. The rail 20 may be either solid or hollow.

To mount the rail 20 to the door frame 12 so that the first longitudinal axis A is substantially horizontal, the door frame 12 includes a horizontal rail support plate 24. Threaded studs, such as 26, project upwardly from several locations along the length of the rail support plate 24. At corresponding locations along the length of rail 20, rail mounting plates, such as 28, are attached to the lower surface of the rail, for example by welding. The rail mounting plates 28 have holes therethrough for receiving the upright studs 26 and are secured to the rail support plates 24 by nuts, such as 29. Thus, the rail 20 is mounted to the frame 12 so that the first longitudinal axis A is substantially horizontal.

Figure 2:
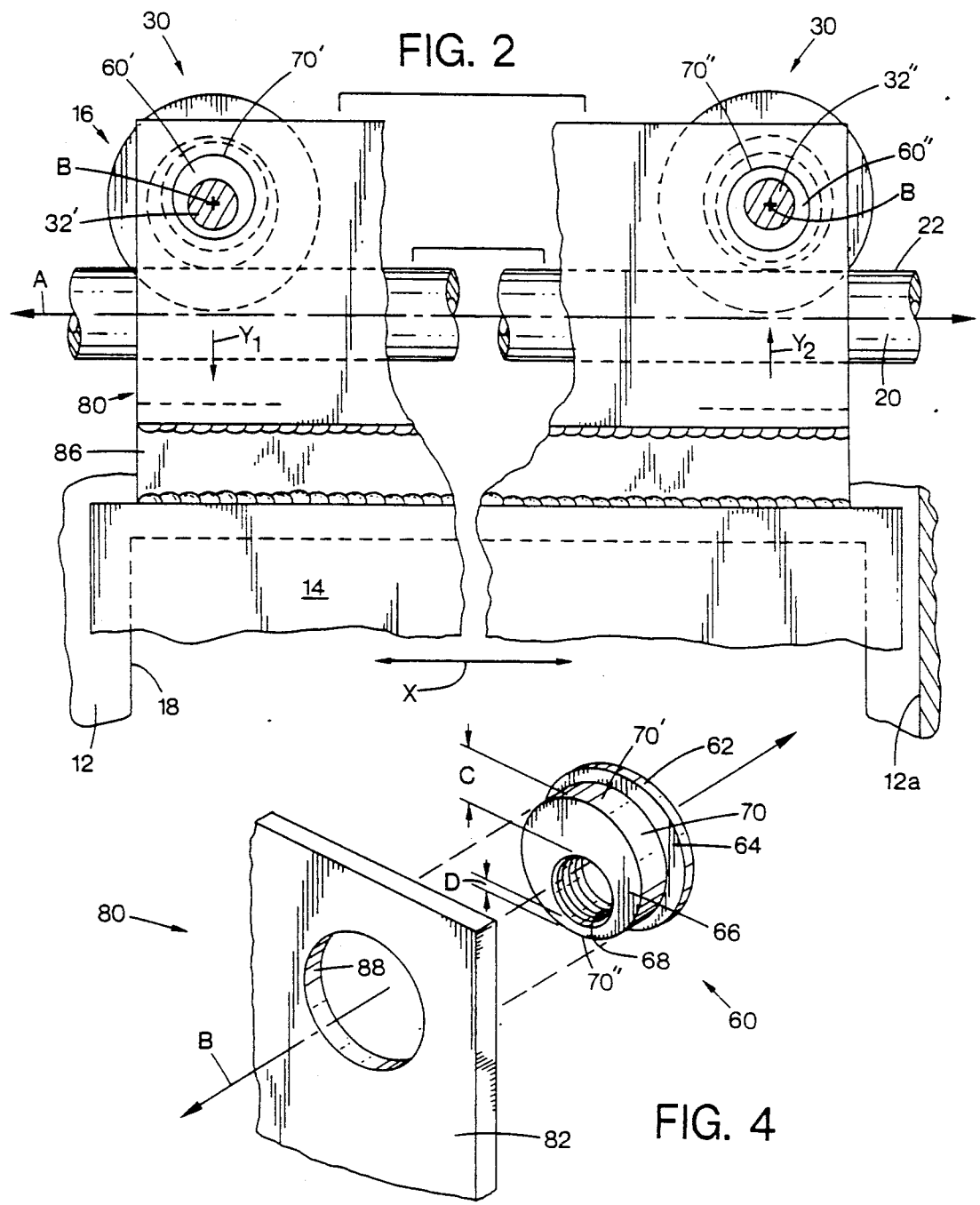
FIG. 2 is a cross sectional view taken along line 2—2 of FIG. 1.

The suspension system 16 also includes a roller assembly 30, with preferably two roller assemblies being used to suspend the door 14, as shown in FIG. 2. The roller assembly 30 includes a shaft or axle 32 having a second longitudinal axis B. The axle 32 has a bearing surface 34 (see FIG. 3), and first and second externally threaded ends 36, 38 to each side of the bearing surface 34. The axle further includes means for preventing rotation of the axle during the suspension system assembly, such as slot 42 located in the end of the axle adjacent the first threaded end 36.

Figure 3:
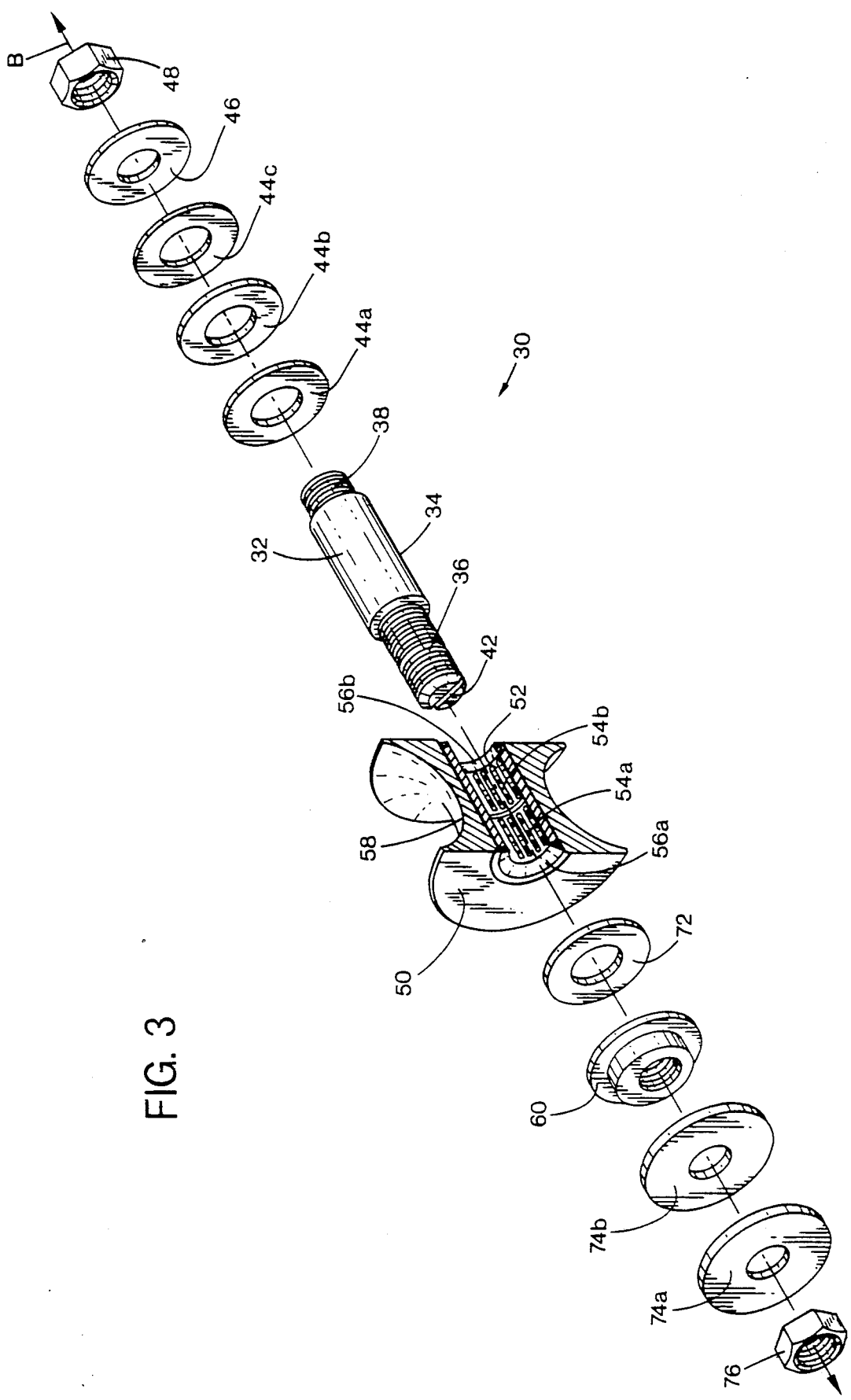
FIG. 3 is a partially cutaway exploded view of one form of a roller assembly of the present invention.

In the illustrated embodiment of FIGS. 1 and 3, the axle 32 is preferably machined from 8620 steel, which is a nickel, chromium, and molybdenum alloy. After machining, the axle is case hardened to a depth of 0.010–0.030 inches to a Rockwell hardness of 58–62 C. For an axle 32 having a nominal length of approximately 3.38 inches and a nominal bearing surface diameter of 0.625 inches, the first threaded end is approximately 1.10 inches long, the bearing surface is 1.82 inches long, and the second threaded end is 0.46 inches long.

Referring to FIGS. 1 and 3, the roller assembly 30 has attachment means which include nylon washers, such as the three washers labelled 44a, 44b and 44c, and a steel washer 46 assembled on the second threaded end 38 of axle 32. The attachment means also includes a steel jam nut 48, which threadably engages the second threaded end 38 to secure the washers 44 and 46 on the axle 32. The steel washer 46 has a nominal ½ inch inner diameter, whereas the nylon washers 44 have a nominal 0.625 inch inner diameter to ride on the bearing surface 34 in the illustrated embodiment. The nylon washers 44 have a nominal outer diameter of 1.125 inches and a thickness of 0.060 inches in this embodiment. Further components of the attachment means will be described below.

The roller assembly 30 further includes a roller 50 having a second longitudinal axis B. The roller 50 also has a concentric hollow bore 52 for seating bearing means 54 and through which the axle 32 extends in supportive rotational engagement with the bearing means. The bearing means 54 may be a bushing (not shown) or an antifriction bearing assembly, such as one having needle bearings. In the illustrated embodiment, two drawn cup needle bearing assemblies 54a and 54b are press fit within the bore 52. O-ring seals 56a and 56b are installed in the bore 52 outboard of each needle bearing assembly 54a, 54b, respectively.

The roller 50 also has a roller guide engaging surface 58 of a shape which conforms to and rollingly engages the upper roller guide surface 22 when the roller guide engaging surface 58 engages the rail 20 and the second longitudinal axis B is substantially perpendicular to the first longitudinal axis A, as shown in FIGS. 1 and 2. Thus, for an arcuate upper roller guide surface 22, the roller guide engaging surface 58 is also arcuate. In the illustrated embodiment, rail surface 22 is circular and convex; whereas the roller surface 58 is circular, of approximately the same radius as rail surface 22, and concave.

The roller 50 is preferably of a self-lubricating bearing material, such as an internally lubricated acetal plastic. A suitable plastic is commercially available under the trade name DELRIN AF Blend, which is a blend of DELRIN and DELRIN AF (DELRIN is a trademark of E. I. DuPont Company). The amount of lubricant impregnated within the plastic is measured in terms of a TFE fiber content. The TFE fiber content of the DELRIN AF Blend is approximately 15%, which provides surface lubricity, strength, dimensional stability, and abrasion resistance to the roller 50. The surface lubricity of the roller advantageously provides for a roller-rail interface which does not require periodic maintenance lubrication for smooth and quiet opening and closing of the door 14. DELRIN AF Blend is commercially available from the Polymer Corporation of Reading, Pa.

The roller 50 illustrated in FIGS. 1 and 3 is machined from a 2.25 inch diameter rod of DELRIN AF Blend approximately 1.56 inches long. The diameter of the bore 52 is approximately 0.80 inches, with a roller guide engaging surface 58 having a 0.75 inch radius to conform to a 1.5 inch diameter rail upper roller guide surface 22.

The roller assembly 30 also includes door support means for supporting the door 14. The door support means has height adjustment means for adjusting the height of the door, such as an eccentric sleeve door support or shoulder nut 60. The eccentric door support 60 is threadably engaged to the first threaded end 36 of axle 32, which is outboard of roller 50. Referring to FIGS. 1 through 4, the eccentric door support 60 has a base flange 62 with a base flange first face 64. The eccentric door support 60 has a lateral cylindrical projection 66 concentric with the base flange 62 and projecting outwardly from the first face 64 of the base flange.

The cylindrical outer surface; the projection 66 extends approximately at a right angle to the first flange face 64 to serve as an eccentric door supporting shoulder surface 70. The eccentric shoulder surface 70 is made eccentric by locating the axial center of an internally threaded hole 68, which extends through base flange 62 and projection 66, at an offset distance from the axial center of flange 62 and projection 66. The hole 68 is threaded to engage the first threaded end 36 of the axle 32.

Thus, when the roller assembly 30 is assembled as shown in FIGS. 1 and 3, the eccentric door support is outboard of the roller 50 with the base flange 62 facing toward the roller. The eccentric door support 60 is off-center from the second longitudinal axis B by the offset distance. As shown in FIG. 4, this offset results in the eccentric door supporting shoulder surface 70 having maximum and minimum door height shoulder points 70' and 70''. These maximum and minimum points 70' and 70'' correspond to a maximum raised position dimension C and a minimum lowered position dimension D, respectively, to which the door 14 may be adjusted. This advantageously allows lo for adjustment of the door height and alignment.

In the illustrated embodiment, typical nominal dimensions for eccentric door support 60 include a 1.25 inch diameter base flange 62, a 0.870 inch diameter eccentric door supporting shoulder surface 70, and an offset distance of 0.125 inches. Thus, the eccentric placement of the threaded hole 68 produces a maximum raised position dimension C of approximately 0.310 inches and a minimum lowered position dimension D of approximately 0.050 inches.

The eccentric door support 60 is preferably machined from 8620 steel. After machining, the support 60 is heat treated to a Rockwell hardness of 30–35 C and provided with a phosphate finish to prevent corrosion.

To complete the roller assembly 30 of FIGS. 1 and 3, the attachment means for securing the roller 50 and the eccentric door support 60 on the axle 32 further includes, in addition to washers 44, 46 and nut 48, a nylon washer 72. The attachment means also includes two steel washers 74a, 74b, outboard of the eccentric door support 60, and a nut 76 sized to threadably engage the first threaded end 36.

The nylon washer 72, as well as nylon washers 44, serve as spacers and may vary in number as required to accommodate axial tolerances in the roller assembly components. For example, FIG. 1 illustrates two washers 72, whereas FIG. 3 illustrates only one washer 72. In the illustrated embodiment, washer 72 has a nominal outer diameter of one inch, and a nominal inner diameter of 0.630 inches which allows it to ride on the bearing surface 34.

The heavy door 14 is suspended from above by door suspension means including an L-shaped door hanger 80 which has an upright leg 82 and a substantially horizontal leg 84. The door suspension means also includes a substantially vertical suspension member 86 which interconnects leg 84 of door hanger 80 with door 14. In the illustrated embodiment, suspension member 86 is welded to a lower surface of leg 84 and an upper surface of door 14. Thus, fairly gross adjustments in the height of the door may be made by varying the length of the suspension member 86.

The upright leg 82 of door hanger 80 has a hole 88 therethrough sized to receive the cylindrical projection 66 of the eccentric door support 60. Thus, fine adjustment of the door height and alignment may be accomplished by rotational positioning of the eccentric door support 60 about axle 32.

This fine door height adjustment is illustrated in FIG. 2, where the eccentric door support 60' is adjusted so that the maximum door height shoulder point 70' is above the upper surface of axle 32'. Thus, this end of door is in an uppermost raised position. The eccentric door support 60'' is adjusted so that the minimum door height shoulder point 70'' is above the upper surface of axle 32''. Thus, this opposite end of door 14 is at a lowermost position.

It is apparent that by rotating the eccentric door support 60' from the position shown on axle 32', the door 14 may be adjusted downwardly as indicated by arrow $Y_1$ to intermediate positions before reaching the lowermost position. Similarly, by rotating the indicated by the arrow $Y_2$ to intermediate positions before reaching the uppermost raised position.

Referring to FIG. 1, to achieve such fine adjustment, the door 14 is shimmed from below into the desired height and alignment with frame 12. If the suspension member 86 was properly sized, the roller guide engaging surface 58 is a distance from the rail 20 that is between the maximum and minimum position dimensions C and D.

Immediately prior to the final assembly and adjustment of the door suspension system 16, a thread locking or retaining compound is applied to the first threaded end 36 of axle 32 near the bearing surface 34 to secure the eccentric door support 60 in place after final adjustment. Preferably this thread retaining compound is a high viscosity liquid which cures in approximately thirty minutes at room temperature and provides a shear strength of approximately 3000 psi on steel. Such a suitable thread retaining compound is commercially available from the Loctite Corporation of Newington, Conn., as Loctite Compound No. 620.

With the roller assembly 30 partially assembled with all the items shown in FIG. 3 except washers 74 and nut 76, the cylindrical projection 66 of the eccentric door support 60 is inserted through hole 88 of the door hanger 80. During this insertion, the partial assembly is manually rotated about the second longitudinal axis B the roller guide engaging surface 58 engages the upper roller guide surface 22 of rail 20. While preventing axle 32 from rotating by inserting a screwdriver or similar tool into slot 42, washers 74 and nut 76 are then assembled onto the first threaded end 36 of axle 32, and the entire assembly is drawn together by tightening nut 76. Alternatively, the washers 74 and nut 76 may be loosely assembled during the rotational adjustment of the eccentric door support 60.

The sliding door assembly 10 may be opened or closed manually in the direction indicated in FIG. 2 by arrow X. Optionally, pneumatic or hydraulic opening means 90 having an actuator 92 may be attached to the door 14, such as by a bracket 94. The bracket 90 is attached to the upright leg 82 of door hanger 80, such as by welding.

Manual or remote controlled locking means may also be included in the sliding door assembly 10. A remotely operable locking means is illustrated in FIG. 1 as including a pneumatic or hydraulic cylinder 100 having a threaded actuator 102 mounted to frame 12. The actuator may move upwardly and downwardly as indicated by arrow Z. The locking means also includes a first bracket 104 having upper and lower substantially horizontal legs interconnected by a substantially upright leg. The upper horizontal leg of bracket 104 has a hole 106 therethrough, which receives actuator 102. The bracket 104 is adjusted and secured in place on actuator 102 by two nuts 108a and 108b threadably engaging actuator 102 above and below the upper leg of bracket 104.

The upright leg of bracket 104 has a longitudinal slot 110 therethrough. The bracket 104 is slidably attached to frame 12 by attachment means, such as two stud, washer and nut assemblies 112a and 112b, which extend through slot 110. Attached to the lower leg of bracket 104 is an L-shaped locking finger 114. The locking finger 114 engages a lock engaging recess 116 located in the distal end of leg 84 of door hanger 80.

As shown in FIG. 1, with the actuator 102 extended and bracket 104 in a lowermost position, the locking finger 114 engages the lock engaging recess 116 to secure door 14 in a closed position. When actuator 102 is retracted to an upper position, as indicated by the bracket 104' in dashed lines, the locking finger 114 is raised above the lock engaging recess 116 to allow the door 14 to be slidably opened.

Figure 5:
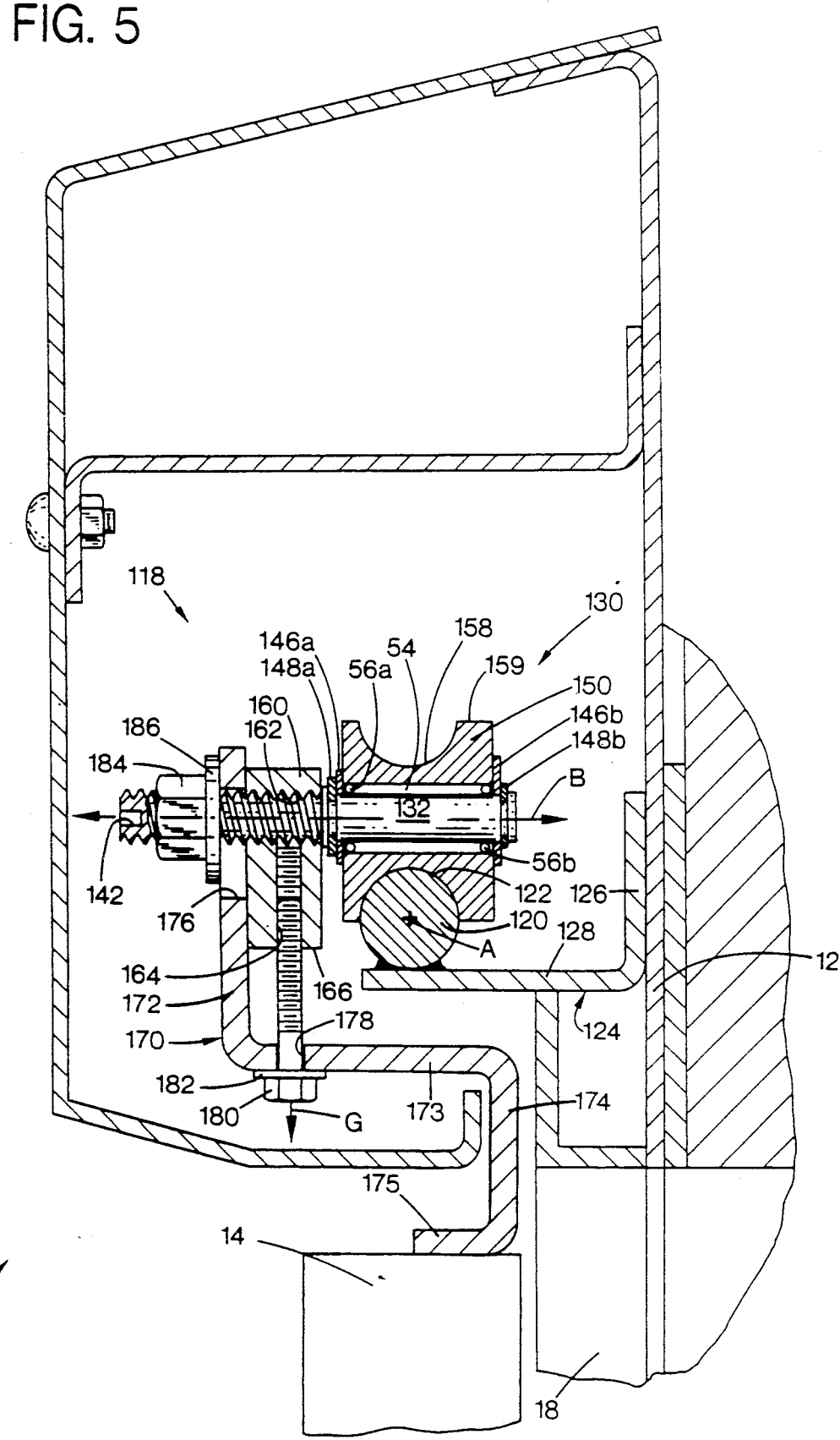
FIGS. 5 and 6 are sectional elevational views of another form of a sliding door assembly of the present invention, illustrating the height adjustment of the door to points at a lowermost position and near an uppermost position, respectively.
Figure 6:
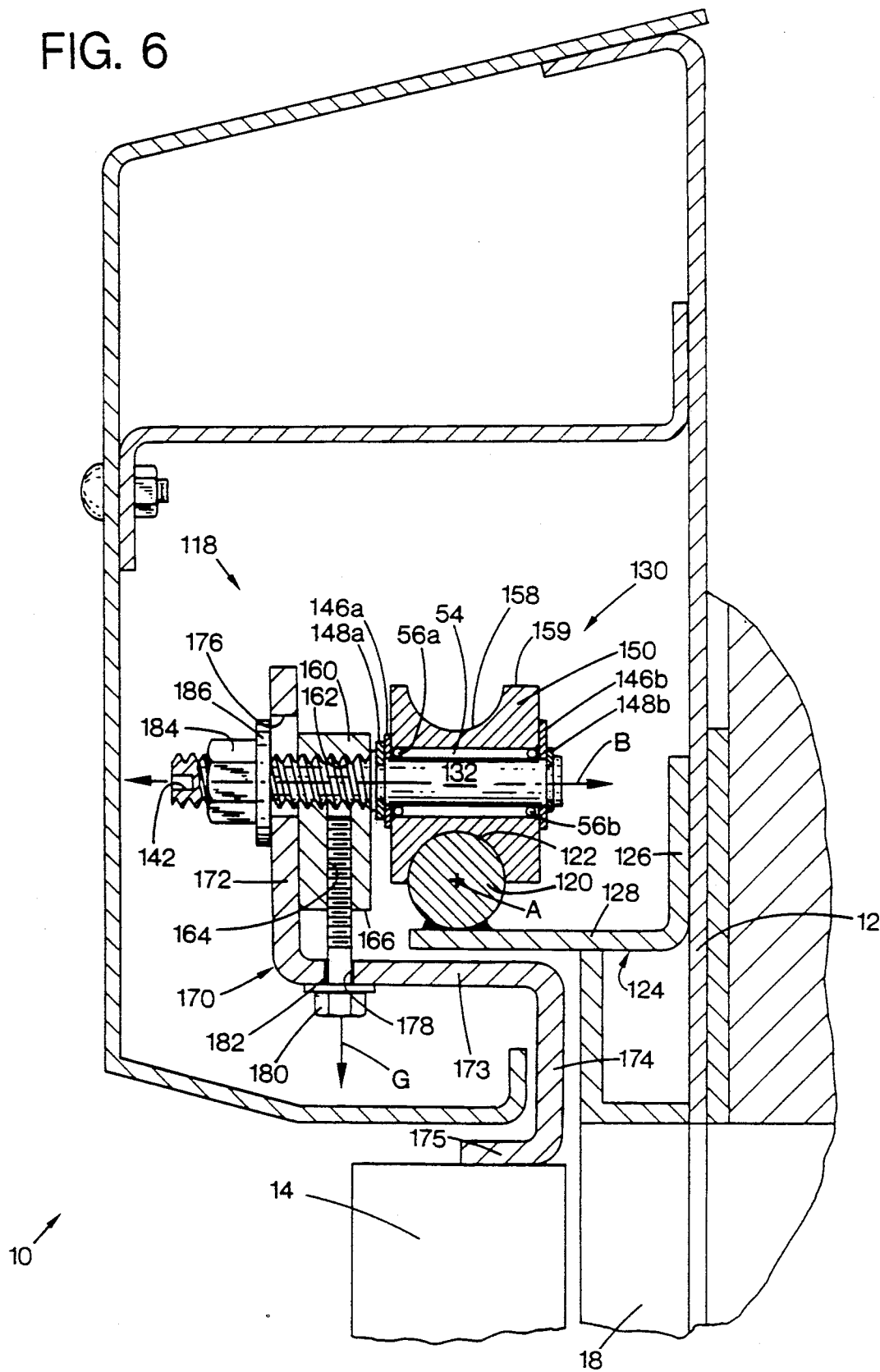
Figure 7:
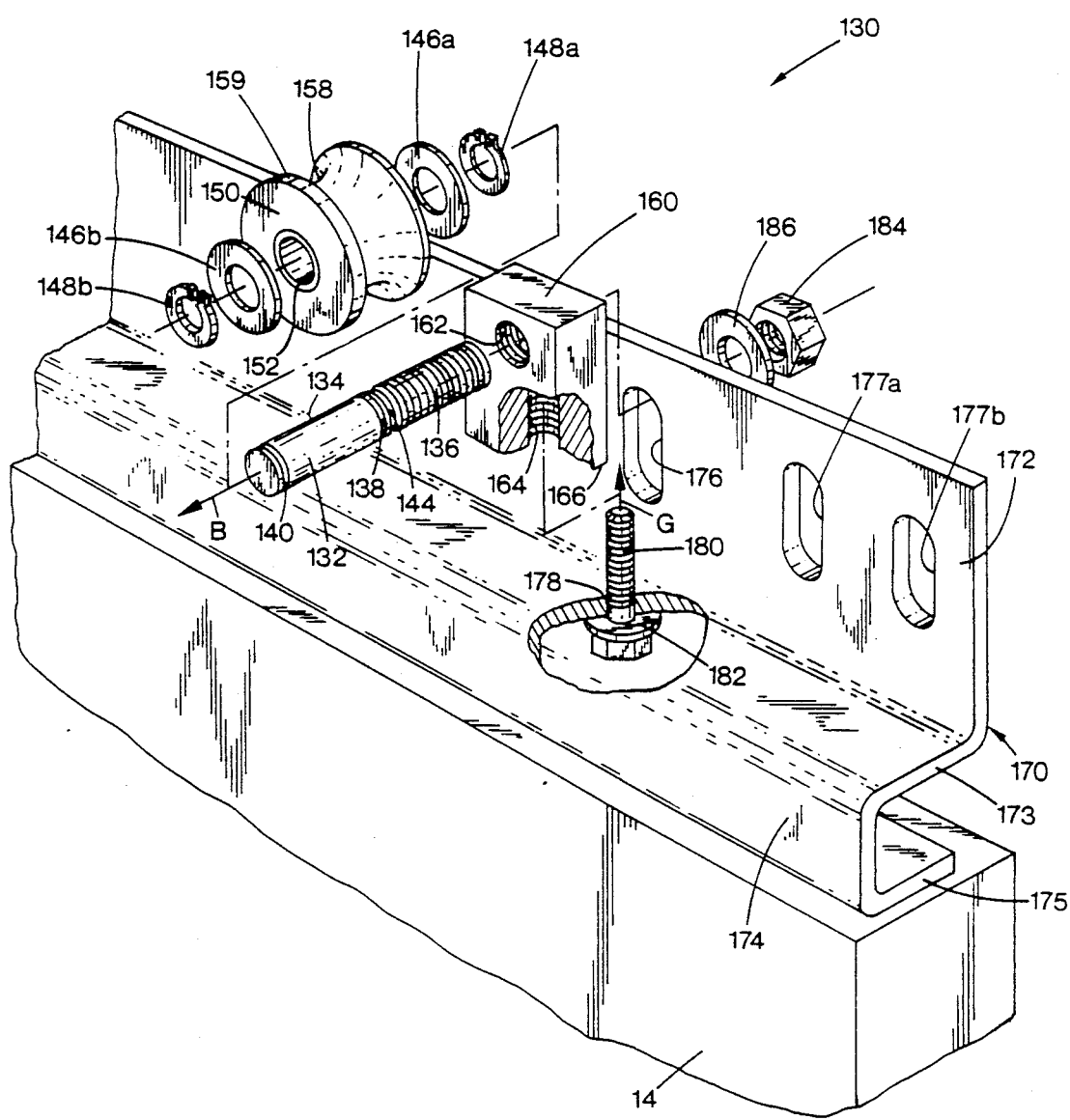
FIG. 7 is a partially cutaway exploded view of one form of several components of the sliding door assembly of FIGS. 5 and 6.

FIGS. 5 through 7 illustrate an alternative preferred embodiment of a sliding door suspension system 118 capable of suspending the heavy door 14 as described above. The locking means and the opening means, which may be as described above, are omitted for clarity in FIGS. 5-7.

The suspension system 118 has a solid rail 120 with an upper roller guide surface 122 and a first longitudinal axis A. The rail 120 has a transverse circular cross section one inch in diameter. The frame 12 is as described above for FIG. 1, except that the horizontal rail support plate 24, studs 26, and rail mounting plates 28, are replaced with a single L-shaped rail mounting member 124. The rail mounting member 124 has an upright leg 126 attached to frame 12, such as by welding, and a substantially horizontal leg 128 to which the lower surface of the rail 120 is mounted, such as by welding.

The roller assembly 130 includes a shaft or axle 132 also having a second longitudinal axis B, and in the illustrated embodiment has the nominal dimensions given below. The axle 132 is 3.57 inches long, and has a bearing surface 134 that is 0.625 inches in diameter and approximately 1.71 inches long. The axle 132 also has an externally threaded end 136. The axle also includes first and second radial external retaining ring grooves 138, 140 located to each side of the bearing surface 134.

The axle 132 has means for preventing rotation during assembly, such as the broached hexagonal axial recess 142 in the end of the axle adjacent the threaded end 136. The axle 132 also includes a strain relief groove 144 having a minimum radius of 0.03 inches located between the first external retaining ring groove 138 and the threaded end 136. The axle 132 is preferably machined from 8620 steel. After machining, the axle is case hardened along the bearing surface 134 a depth of 0.020-0.0035 inches to a Rockwell hardness of 58-62 C.

The roller assembly 130 has attachment means for securing the roller 150 on the axle which include first and second washers 146a and 146b, preferably of steel, having an inner diameter sized for placement of the washers on the bearing surface 134. The attachment means also includes first and second external retaining rings 148a and 148b sized to engage the respective the external retaining ring grooves 138 and 140. Such external retaining rings are commonly referred to as "snap rings". Further components of the attachment means of this embodiment will be described below.

The roller assembly 130 has a roller 150 with bore 152, sized, supported, and of the same material and length as described above for roller 50. However, the use of a solid rail 120 of a smaller diameter than the rail 20 allows roller 150 to be machined from a two inch diameter rod, whereas roller 50 required a 2.25 diameter rod. Thus, the roller assembly 130 is more economical to manufacture than roller assembly 30 due to decreased material costs.

The roller 150 has a roller guide engaging surface 158, which has an approximate half-inch radius in the illustrated embodiment to rollingly engage the one inch diameter upper roller guide surface 122 of rail 120. The roller 150 also includes a wider reinforcing shoulder 159 having a two inch diameter and located adjacent one end of roller 150. The reinforcing shoulder 159, assembled in the manner shown, increases the strength and enhances the integrity of the door suspension system 118. For example, additional roller strength is provided by reinforcing shoulder 159 to resist breakage from external forces applied to door 14 in the direction indicated by arrow F in FIG. 5, as by prisoners trying to escape.

Referring to FIG. 5, the door support height an adjuster block 160. In the illustrated embodiment the adjuster block 160 may be machined from a 1.875 inch length of one-half by one inch 1018 cold rolled steel rectangular bar stock. After machining as described below, the adjuster block 160 may be provided with a phosphate finish to prevent corrosion.

The adjuster block 160 has a first internally threaded hole 162 sized to threadably engage the first threaded end 136 of axle 132. Thus when assembled as shown in FIGS. 5-7, the longitudinal axis of hole 162 is colinear with the second longitudinal axis B of the axle 132. The adjuster block 160 also has a second internally threaded hole 164 extending from a first end 166 of the block through the length of the block to intersect with and terminate at the first internally threaded hole 162. Hole 164 has a longitudinal axis, indicated by arrow G, which is perpendicular to both the first and second longitudinal axes A and B, and which intersects axis B when assembled. Thus, the first and second holes 162 and 164 are mutually perpendicular.

The door support means and adjuster means of FIGS. 5-7 further include a door hanger member or support bracket 170. The door hanger 170 may be an integral piece having three approximately ninety degree bends forming an upright leg 172, a substantially horizontal leg 173, a frame-exiting substantially vertical leg 174, and a door attachment leg 175. The leg 175 is attached to the door 14, such as by welding. The upright leg 172 has a longitudinal slot 176 therethrough, illustrated as being approximately five-eighths inches wide and one and one-quarter inches high. Leg 172 also has holes, such as slotted holes 177a and 177b, therethrough for mounting locking means (not shown) to the door hanger 170. The leg 173 also has a hole 178 therethrough for the door height adjustment means as described below.

The door support means and height adjustment means further include a threaded member, such as bolt 180, which 180 extends through hole 178 to threadably engage the second internally threaded hole 164 of adjuster block 160. A washer 182 is included between leg 173 and the head of bolt 180.

To complete the roller assembly 130, the attachment means for securing the roller 150 and door support means on the axle 132 further include a steel nut 184 threadably engaged with the first threaded end 136 of axle 132. The attachment means also includes a steel washer 186 sandwiched between nut 184 and the door support bracket upright leg 172.

The operation of the door height adjustment means for adjustment and alignment of door 14 relative to frame 12 is illustrated by FIGS. 5 and 6. In a lowermost position shown in FIG. 5, the axle 132 engages the upper surface of slot 176 and bolt 182 engages a minimum portion of the threads within hole 164. In an uppermost position axle 132 is adjacent the lower surface of slot 176 and bolt 180 engages a maximum portion of the threads within hole 164. It is clear that intermediate height positions between the lowermost and uppermost positions, such as FIG. 6 which is near the uppermost position, are attainable by varying the degree of threaded interengagement of bolt 180 with hole 164 of the adjuster block 160.

These adjustments may be made without shimming door 14, as described above for the eccentric door support 60. With nut 184 loosened slightly and the roller 150 engaging the rail 120, bolt 180 is rotated until the desired door height is achieved. At this point, the door may be advantageously opened and closed to verify alignment and proper adjustment throughout the path of travel. When properly adjusted, the roller assembly 130 is secured in place by tightening nut 184 while preventing axle 132 from rotating by inserting a hexagonal wrench or similar tool into the hexagonal recessed hole 142.

Having illustrated and described the principles of our invention with respect to a preferred embodiment, it should be apparent to those skilled in the art that our invention may be modified in arrangement and detail without departing from such principles. For example, other locking and door operating or actuating means may be employed, as well as suitable material substitutions and dimensional variations for the components of the sliding door suspension system. We claim all such modifications falling within the scope and spirit of the following claims.

We claim:

1. A sliding door suspension system for supporting a heavy door in a door frame, comprising:

a rail having an upper roller guide surface and a longitudinal axis, the upper roller guide surface in transverse cross section being arcuate, the rail being mounted to the door frame such that the first longitudinal axis is substantially horizontal; and a roller assembly including an axle having a second longitudinal axis, a roller having a hollow bore through which the axle extends, bearing means mounted within the hollow bore for rotationally supporting the roller on the axle, the roller also having a roller guide engaging surface of a shape which conforms to and rollingly engages the upper roller guide surface when the second longitudinal axis is substantially perpendicular to the first longitudinal axis and the roller guide engaging surface engages the rail, door support means mounted to the axle outboard of the roller for supporting the door, and attachment means for securing the roller and door support means on the axle, the door support means having height adjustment means threadably engaged with the axle for adjusting the height of the door with the attachment means disengaged, and the door height being maintained when the attachment means are secured, whereby the door support means supports the door while the roller rolls along the rail to slidably open and close the door in a direction substantially parallel to the first longitudinal axis.

2. A sliding door suspension system according to claim 1 wherein the height adjustment means comprises an eccentric door supporting surface which is eccentric to the second longitudinal axis so that the height of the door may be adjusted by rotating the door support means on the axle.

3. A sliding door suspension system according to claim 2 wherein the door support means comprises an eccentric door support having a base flange with a base flange first face and a lateral cylindrical projection with a cylindrical outer surface projecting outwardly from the base flange first face, the base flange and projection having an eccentric internally threaded hole extending therethrough which threadably receives the axle, the eccentric internally threaded hole axially centered at an offset distance from the axial center of the projection, the cylindrical outer surface of the projection extending approximately at a right angle from the base flange first face to serve as the eccentric door supporting surface.

4. A sliding door suspension system according to claim 1 further including height adjustment means for adjusting the height of the door relative to the door frame, the height adjustment means comprising a cylindrical door supporting eccentric sleeve member threadably mounted eccentrically on the axle, the eccentric sleeve member having an outer surface in supporting engagement with the door, whereby rotation of the eccentric sleeve member causes the second longitudinal axis to be adjusted vertically.

5. A sliding door suspension system according to claim 1 wherein the axle includes a bearing surface upon which the bearing means rides, and first and second externally threaded ends to each side of the bearing surface, the first threaded end threadably engaged with the door support means, and the attachment means threadably engaged to each of the first and second threaded ends.

6. A sliding door suspension system according to claim 5 wherein the door support means has an eccentric door supporting surface which is eccentric to the second longitudinal axis so that the height of the door may be adjusted by rotating the door support means on the axle.

7. A sliding door suspension system according to claim 1 further comprising two roller assemblies, and wherein:
 the rail has a transverse circular cross section;
 each axle includes a bearing surface upon which the bearing means rides, and first and second externally threaded ends to each side of the bearing surface with the first threaded end threadably engaged with the respective door support means;
 the bearing means comprises a bearing assembly having needle bearings;
 the attachment means is threadably engaged to each of the first and second threaded ends; and
 each door support means has an eccentric door supporting surface which is eccentric to the second longitudinal axis so that the height and alignment of the door relative to the door frame may be adjusted by rotating each door support means on the respective axle.

8. A sliding door suspension system according to claim 1 wherein the axle comprises:
 a bearing surface upon which the bearing means rides;
 first and second radial grooves to each side of the bearing surface;
 first and second external retaining rings received within the respective first and second radial grooves to secure the roller on the axle; and
 an externally threaded end beyond the first radial groove which threadably engages the door support means;
 wherein the attachment means comprises a nut threadably engaging the axle threaded end and the first external retaining ring.

9. A sliding door suspension system for supporting a heavy door in a door frame, comprising:
 a rail having an upper roller guide surface and a first longitudinal axis, the upper roller guide surface in transverse cross section being arcuate, the rail being mounted to the door frame such that the first longitudinal axis is substantially horizontal; and
 a roller assembly including an axle having a second longitudinal axis, a roller having a hollow bore through which the axle extends, bearing means mounted within the hollow bore for rotationally supporting the roller on the axle, the roller also having a roller guide engaging surface of a shape which conforms to and rollingly engages the upper roller guide surface when the second longitudinal axis is substantially perpendicular to the first longitudinal axis and the roller guide engaging surface engages the rail, door support means mounted to the axle outboard of the roller for supporting the door, and attachment means for securing the roller and door support means on the axle, whereby the door support means supports the door while the roller rolls along the rail to slidably open and close the door in a direction substantially parallel to the first longitudinal axis;
 wherein the axle and door support means are threadably engaged, and the door support means has height adjustment means for adjusting the height of the door with the attachment means disengaged, and the door height being maintained when the attachment means are secured;
 wherein the door support means includes an adjuster member and a door hanger member having an upright leg and a substantially horizontal leg for supporting the door therefrom, the upright leg having a longitudinal slot therethrough which slidably receives the axle, the horizontal leg having a hole therethrough, the adjuster member having a first internally threaded hole therethrough which threadably engages the axle and a second internally threaded hole perpendicular to, intersecting with and terminating at the first internally threaded hole; and
 wherein the height adjustment means comprises a threaded member which extends through the hole in the horizontal leg and threadably engages the second internally threaded hole in variable amounts to vary the position of the axle in the longitudinal slot thereby adjusting the height of the door.

10. A sliding door suspension system for supporting a heavy door in a door frame, comprising:
 a rail having an upper roller guide surface and a first longitudinal axis, the upper roller guide surface in transverse cross section being arcuate, the rail being mounted to the door frame such that the first longitudinal axis is substantially horizontal; and
 a roller assembly including an axle having a second longitudinal axis, a roller having a hollow bore through which the axle extends, bearing means mounted within the hollow bore for rotationally supporting the roller on the axle, the roller also having a roller guide engaging surface of a shape which conforms to and rollingly engages the upper roller guide surface when the second longitudinal axis is substantially perpendicular to the first longitudinal axis and the roller guide engaging surface engages the rail, door support means mounted to the axle outboard of the roller for supporting the door, and attachment means for securing the roller and door support means to the axle, wherein the door support means further comprises:
 a door hanger member having an upright leg and a substantially horizontal leg for supporting the door therefrom, the upright leg having a longitudinal slot therethrough which slidably receives the axle, the horizontal leg having a hole therethrough;

an adjuster member having a first internally threaded hole therethrough which threadably engages the axle and a second internally threaded hold perpendicular to, intersecting with and terminating at the first internally threaded hole; and a threaded member which extends through the hole in the first leg and threadably engages the second internally threaded hole in variable amounts to vary the position of the axle in the longitudinal slot thereby adjusting the height of the door, whereby the door support means supports the door while the roller rolls along the rail to slidably open and close the door in a direction substantially parallel to the first longitudinal axis.

11. A sliding door suspension system for supporting a heavy door in a door frame, comprising:

a rail having an upper roller guide surface and a first longitudinal axis, the upper roller guide surface in transverse cross section being arcuate, the rail being mounted to the door frame such that the first longitudinal axis is substantially horizontal; and two roller assemblies, each roller assembly including: an axle having a second longitudinal axis, a roller having a hollow bore through which the axle extends, bearing means mounted within the hollow bore for rotationally supporting the roller on the axle, the roller also having a roller guide engaging surface of a shape which conforms to and rollingly engages the upper roller guide surface when the second longitudinal axis is substantially perpendicular to the first longitudinal axis and the roller guide engaging surface engages the rail, door support means mounted to the axle outboard of the roller for supporting the door, and attachment means for securing the roller and door support means on the axle, whereby the door support means supports the door while the roller rolls along the rail to slidably open and close the door in a direction substantially parallel to the first longitudinal axis;

wherein the rail has a transverse circular cross section;

wherein each axle including a bearing surface upon which the bearing means rides, first and second radial grooves to each side of the bearing surface, and an externally threaded end beyond the first radial groove which threadably engages the door support means;

wherein each bearing means comprises a bearing assembly having needle bearings;

wherein each attachment means threadably engages the threaded end and the second radial groove of each respective axle; and wherein each door support means comprises:

a door hanger member having an upright leg and a substantially horizontal leg for supporting the door therefrom, the upright leg having a longitudinal slot therethrough which slidably receives the axle, the horizontal leg having a hole therethrough;

an adjuster member having a first internally threaded hole therethrough which threadably engages the axle and a second internally threaded hole perpendicular to, intersecting with and terminating at the first internally threaded hole; and a threaded member which extends through the hole in the first leg and threadably engages the second internally threaded hole in variable amounts to vary the position of the axle in the longitudinal slot thereby adjusting the height of the door.

12. A sliding door assembly comprising:

a door frame;

a heavy door;

a rail having an upper roller guide surface and a first longitudinal axis, the upper roller guide surface in transverse cross section being arcuate;

mounting means for mounting the rail to the door frame such that the first longitudinal axis is substantially horizontal; and a roller assembly including an axle having a second longitudinal axis, a roller having a hollow bore through which the axle extends, bearing means mounted within the hollow bore for rotationally supporting the roller on the axle, the roller also having a roller guide engaging surface of a shape which conforms to and rollingly engages the upper roller guide surface when the second longitudinal axis is substantially perpendicular to the first longitudinal axis and the roller guide engaging surface engages the rail, door support means including an L-shaped member having an upright leg mounted to the axle outboard of the roller and a substantially horizontal leg extending from the upright leg and under the rail for supporting the heavy door with the horizontal leg terminating in a lock receiving portion, and attachment means for securing the roller and door support means on the axle, whereby the door support means supports the door while the roller rolls along the rail to slidably open and close the door in a direction substantially parallel to the first longitudinal axis; and locking means having a locking member movable between a door locking position a door opening position for respectively locking and unlocking the heavy door, the locking means being secured to the door frame so as to allow the locking member to engage the lock receiving portion of the door support means when the door is closed, and to disengage the lock receiving portion of the door support means to unlock the door.

13. A sliding door assembly according to claim 16 wherein the axle and door support means are threadably engaged, and the door support means has height adjustment means for adjusting the height of the door with the attachment means disengaged, and the door height being maintained when the attachment means are secured.

14. A roller assembly for a sliding door suspension system which supports a heavy door in a door frame, the suspension system having a rail with an upper roller guide surface and a first longitudinal axis, the upper roller guide surface in transverse cross section being arcuate, the rail mounted to the door frame such that the first longitudinal axis is substantially horizontal, the roller assembly comprising:

an axle having a second longitudinal axis;

a roller having a hollow bore through which the axle extends;

bearing means mounted within the hollow bore for rotationally supporting the roller on the axis;

the roller also having a roller guide engaging surface of a shape which conforms to and rollingly engages the upper roller guide surface when the second longitudinal axis is substantially perpendicular to the first longitudinal axis and the roller guide engaging surface engages the rail, the roller also having inboard and outboard shoulders to each side of the roller guide engaging surface, with the outboard shoulder having a first longitudinal width and the inboard shoulder having a second longitudinal width greater than the first longitudinal width;

door support means mounted to the axle near the outboard shoulder of the roller for supporting the heavy door; and attachment means for securing the roller and door support means on the axle, whereby the door support means supports the door while the roller rolls along the rail to slidably open and close the door in a direction substantially parallel to the first longitudinal axis.

15. A roller assembly according to claim 19 wherein the door support means has height adjustment means threadably engaged with the axle for adjusting the height of the door with the attachment means disengaged, and the door height being maintained when the attachment means are secured.

* * * * *

UNITED STATES PATENT AND TRADEMARK OFFICE
CERTIFICATE OF CORRECTION

PATENT NO. : 5,070,575

DATED : December 10, 1991

INVENTOR(S) : Carl E. Redman et al.

It is certified that error appears in the above-identified patent and that said Letters Patent is hereby corrected as shown below:

Column 3, line 52, "System !6" should be --System 16--;

Column 5, line 64, "10" should be omitted;

Column 6, line 59, "rotating the indicated" should be --rotating the eccentric door support 60", the door may be raised as indicated--;

Column 9, line 1, "the door support height an adjuster block 160" should be --the door support height adjustment means includes an adjuster member, such as door adjuster block 160--;

Claim 1, column 10, line 23, "surface and a longitudinal" should be --surface and a first longitudinal--;

Claim 11, column 13, line 45, "including" should be --includes--;

Claim 14, column 14, line 66, "axis" should be --axle--; and

UNITED STATES PATENT AND TRADEMARK OFFICE
CERTIFICATE OF CORRECTION

PATENT NO. : 5,070,575

DATED : December 10, 1991

INVENTOR(S) : Carl E. Redman et al

It is certified that error appears in the above-indentified patent and that said Letters Patent is hereby corrected as shown below:

Claim 15, Column 16, line 7, "claim 19" should be --claim 14--.

Signed and Sealed this

Second Day of November, 1993

Attest:

BRUCE LEHMAN

*Attesting Officer*  *Commissioner of Patents and Trademarks*